July 3, 1962 — M. HRENO — 3,041,771
ILLUMINATED FISHING BOBBER
Filed Jan. 23, 1959
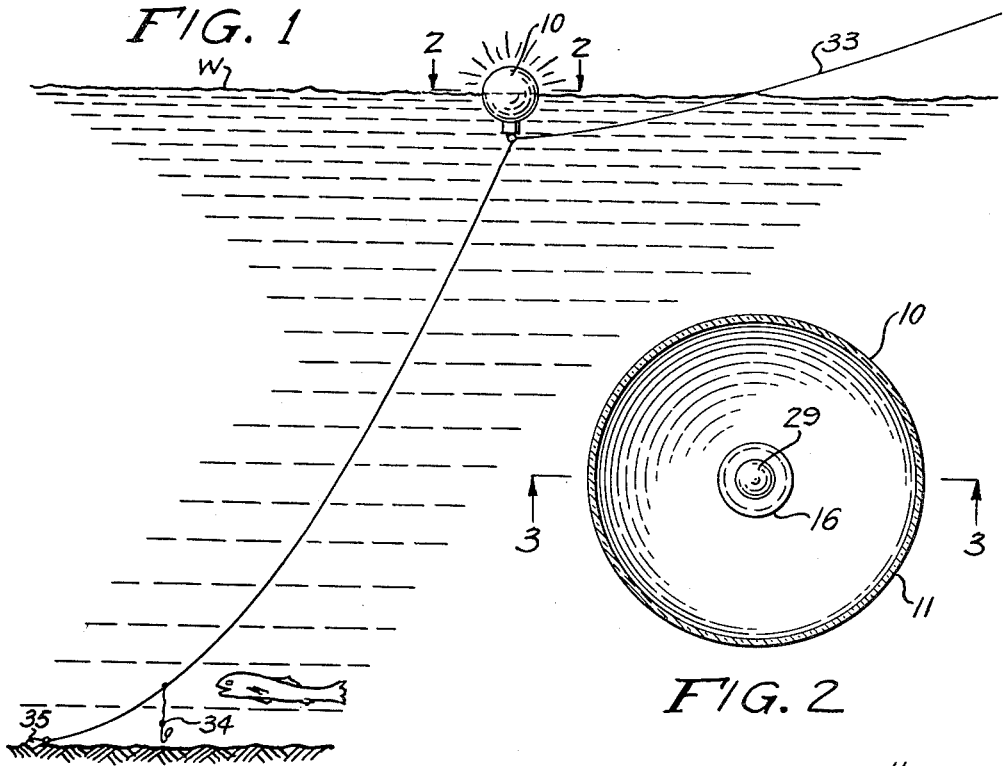
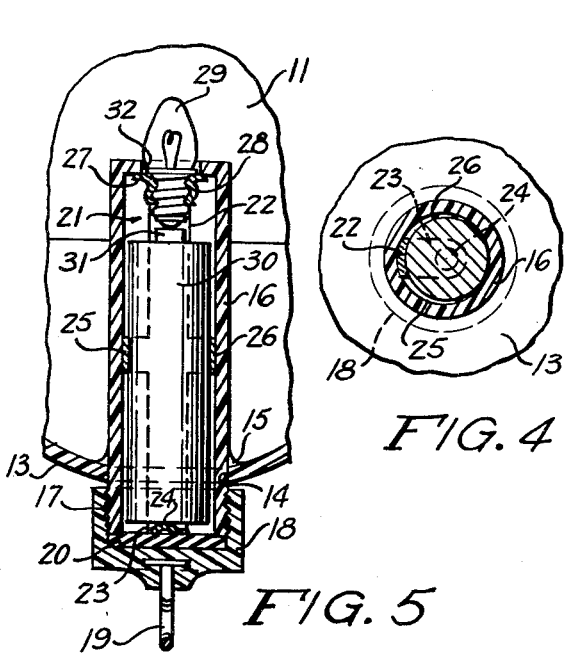
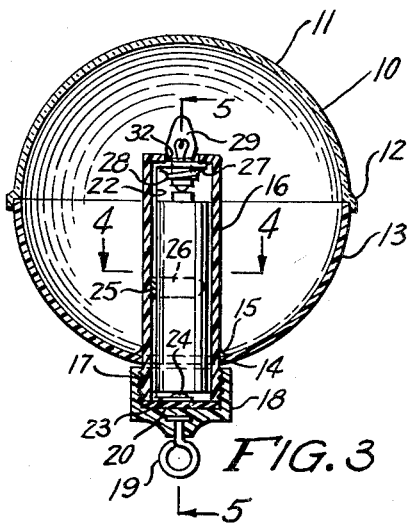
INVENTOR.
MICHEAL HRENO
BY Patrick D. Beavers
ATTORNEY.

United States Patent Office 3,041,771
Patented July 3, 1962

3,041,771
ILLUMINATED FISHING BOBBER
Micheal Hreno, 785 Crest Drive, Monessen, Pa.
Filed Jan. 23, 1959, Ser. No. 788,554
1 Claim. (Cl. 43—17.5)

This invention relates to improvements in fishing bobbers and more particularly to an illuminated fishing bobber that is adapted to be used for night fishing.

An object of this invention is to provide an illuminated bobber that when used at night will by its illumination indicate the presence of a fish when the fish nibbles on the fishhook on the fishing line to which the bobber is attached.

Another object of the invention is to provide an illuminated fishing bobber that is inexpensive to manufacture and efficient in operation.

With the above and other objects and advantages in view, the invention consists of the novel details of construction, arrangement and combination of parts more fully hereinafter described, claimed and illustrated in the accompanying drawing, in which:

FIG. 1 is an illustrated view of an illuminated fishing bobber embodying the invention in operation;

FIG. 2 is a transverse sectional view on the line 2—2 of FIG. 1;

FIG. 3 is a transverse sectional view on the line 3—3 of FIG. 2;

FIG. 4 is a transverse sectional view on the line 4—4 of FIG. 3; and

FIG. 5 is a vertical sectional view on the line 5—5 of FIG. 3.

Referring more in detail to the drawing, wherein like parts are designated by like reference numerals, the reference numeral 10 is used to generally designate an illuminated fishing bobber embodying the invention.

The bobber 10 is hollow of any desired shape, and comprises a first section 11 which is provided with an annular flange 12 which is adapted to receive the edge of a second section 13. The sections 11 and 13 are made of a suitable plastic and a suitable adhesive or friction fit binds the two sections 11 and 13 together at the flange 12 in rigid relation to each other.

The center of the section 13 is provided with an opening 14 that is reinforced by a raised boss 15.

A tube 16 can be employed, and if so, can be plastic, extended through the opening 14 until it protrudes a short distance from the outer surface of the section 13. At this point adhesive is used to bind the tube 16 in rigid relation to the section 13.

The outer end of the tube 16 is provided with threads 17 to receive a closure cap 18 and an eye 19 is pivotally mounted in the cap 18. When the cap 18 is threaded on to the threads 17 of the tube 16, a rubber sealing gasket 20 is placed in the cap 18 and engaging the edge of the tube 16 seals the interior of the tube 16 from water.

To provide the bobber 10 with illumination, a metal lighting unit 21 is inserted into the tube 16.

The lighting unit 21 comprises an elongated strip 22 which is provided at one end with a short right angularly disposed flange 23 which carries a contact 24 thereon.

Centrally of the strip 22 there is formed integrally therewith a pair of curved oppositely disposed arms 25 and 26, respectively.

A flange 27 is formed integral with the opposite end of the strip 22 and extends therefrom at right angles thereto in parallel relation to the flange 23. The flange 27 is provided with a socket 28 that will receive a light bulb 29 and a battery 30 will be positioned within the arms 25 and 26 so that the positive end 31 will engage the light bulb 29 and the opposite end will engage the contact 24. The battery 30 will thus energize the light bulb 29 and illuminate the body 11 of the bobber 10. Section 12 will be transparent or of a light color while the section 13 will be opaque and of a dark color.

In use the bobber 10 is connected to a fishing line 33 by means of the eye 19 and the line 33 is connected to a fishhook 34 and weight 35.

When the weight 35 has been cast into the water, the bobber 10 will float on the surface of the water W and indicate in the usual manner when a fish, as shown in FIG. 1, is nibbling at the bait on the fishhook 34.

The friction fit permits the lighting unit 21 to be removed to replace the light bulb 29 or the battery 30, or the lighting outfit may be left out so that the bobber can be used in the daytime.

The bobber 10 is illuminated especially for night fishing and thus the fisherman, by the illumination of the bobber 10 is enabled to tell when a fish is nibbling at his fishhook.

There is thus provided an illuminated fishing bobber that is made of plastic and is inexpensive to manufacture and it is believed that the structure and operation of the invention will be clear to those skilled in the art from the foregoing description.

It is also to be understood that changes in the minor details of construction, arrangement and combination of parts may be resorted to provided they fall within the spirit of the invention and the scope of the appended claim.

Having thus described the invention what is claimed as new and desired to be secured by Letters Patent is:

An illuminated fishing bobber comprising in combination a hollow body and means in said body for illuminating said body, said body comprising a first semi-circular transparent section having a flange on the peripheral edge thereof and a second semi-circular opaque section that is adapted to have the peripheral edge thereof engaged by the flange of said first section, said opaque section having an opening in the center thereof, the opening having a raised annular boss for the reinforcing thereof, a tube having an opening in the inner end thereof and an outer open end extended into said body through the opening in said opaque section, means for rigidly securing said tube to said raised annular boss, the outer open end of said tube having threads thereon, a closure cap having an eye pivotally mounted in the center thereof threaded onto the threads on said tube, a gasket in said closure engaging the outer open end of said tube, and said illuminating means positioned in said tube and comprising an elongated metal strip having a flange on one end provided with a contact, a flange on the opposite end provided with a socket to receive a light bulb which extends through the opening in the inner end of said tube, and a pair of diametrically opposed arcuate shaped arms that are formed integrally with the center of said strip and extending toward each other provide means to engage a battery and retain the battery in engagement longitudinally therewith said strip, the light bulb at one end and the contact on the flange on said one end of said strip.

References Cited in the file of this patent

UNITED STATES PATENTS

| | | |
|---|---|---|
| 2,236,215 | Klinitski | Mar. 25, 1941 |
| 2,272,802 | High et al. | Feb. 10, 1942 |
| 2,431,420 | Pope | Nov. 25, 1947 |
| 2,527,956 | Peevey | Oct. 31, 1950 |
| 2,598,471 | Waite | May 27, 1952 |

FOREIGN PATENTS

| | | |
|---|---|---|
| 457,269 | Italy | May 12, 1950 |